Nov. 14, 1933.                R. H. GALT                1,935,316

DETECTOR

Filed Sept. 16, 1931

INVENTOR
R. H. GALT
BY
G. N. Stevenson
ATTORNEY

Patented Nov. 14, 1933

1,935,316

UNITED STATES PATENT OFFICE 1,935,316

DETECTOR

Rogers H. Galt, Mountain Lakes, N. J., assignor to Bell Telephone Laboratories, Incorporated, New York, N. Y., a corporation of New York Application September 16, 1931
Serial No. 563,020

3 Claims. (Cl. 250—27)

This invention relates to systems for converting or translating an electric current or voltage of given characteristics into another current or voltage having different characteristics, and particularly to rectifiers, detectors, and modulators wherein space discharge devices are employed.

The present application includes subject matter previously disclosed in, and is a continuation in part of my application, Serial No. 340,576, filed February 16, 1929.

The term "detector" will be used, for the purposes of this application, to include rectifiers, detectors, modulators, and other converting or translating devices.

In operating a detector it is usually desirable to control the quantitative relation between the input and output of the device. When the function of the detector is to receive intelligible signals from an applied modulated wave, the direct current output of the detector is preferably proportional at every instant to the varying amplitude of the modulated wave. For other purposes, however, it is desirable to have a different relationship between the input and output and to be able to regulate in an exact manner the form of this relationship.

In accordance with the present invention a detector is employed comprising one or more space discharge devices each having an input and an output circuit. These circuits are provided with sources of biasing potential and include a number of impedance elements, some of which are individual to a single input or output circuit and other common to more than one circuit. The impressed wave is applied to one or more of the input circuits thereby setting up input currents and output currents which flow in the individual and common impedance elements and set up potential differences which alter the instantaneous value of biasing potential in each circuit. In a simple case the impressed waves are applied to the input circuits of two space discharge devices or tubes. The output current of one tube flows through an impedance element which is common to the output circuit of that tube and the input circuit of the other tube thereby varying the biasing potential in the second input circuit in a manner depending upon the variations in the amplitude of the impressed wave.

In a specific embodiment of the invention, which has been operated, a modulated input wave having an amplitude variable over an extended range was applied to a detector comprising two interconnected space discharge devices so adjusted that the output current of one device varies substantially according to the cube root of the amplitude of the modulated wave. By variously proportioning the several impedance elements and sources of biasing potential, it is possible to adjust a detector to secure any desired functional relationship between the output and input currents within a very wide range.

The invention will be described in detail with reference to the accompanying drawing, in which.

Figure 1:
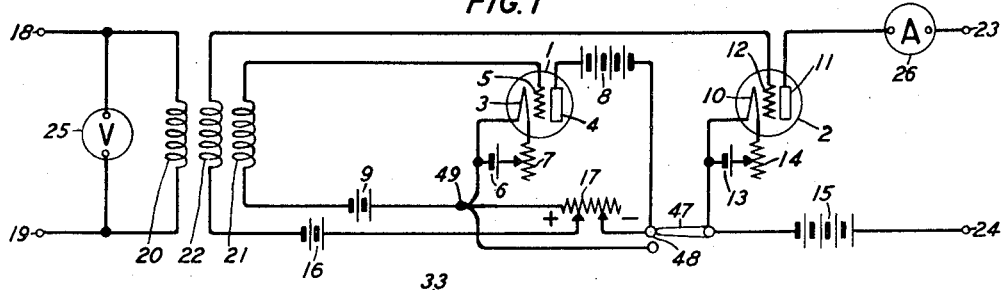
Figs. 1, 2 and 3 represent detectors embodying the invention.

Fig. 1 discloses a detector comprising space discharge devices or tubes 1 and 2. A potentiometer resistance 17 is employed as an impedance element common to the output circuit of discharge device 1 and the input circuit of discharge device 2. Input terminals 18 and 19 are provided for impressing an applied wave upon a transformer primary winding 20 which is coupled to a secondary winding 21 in the input circuit of space discharge device 1 and also to a secondary winding 22 in the input circuit of space discharge device 2. The grid 5 of discharge device 1 is polarized by a battery 9 in the input circuit and the grid 12 of the device 2 is polarized by a battery 16. The filament 3 is heated by a battery 6 regulated by a rheostat 7 and the filament 10 is heated by a battery 13 regulated by a rheostat 14. Space current is supplied to the plates 4 and 11 of the respective space discharge devices by the batteries 8 and 15 respectively. Output terminals 23 and 24 are provided for connecting the output circuit of device 2 with a load circuit of any suitable description. A switch 47 is provided for connecting the filament 10 either to the right-hand side of the resistance 17 at point 48 or to the left-hand side at point 49. A voltmeter 25 is bridged across the terminals 18 and 19 for measuring the impressed voltage and an ammeter 26 is provided in the output circuit of space discharge device 2 for measuring the output current.

In the operation of the system of Fig. 1 the alternating current is impressed upon the input terminals 18 and 19 and by means of the transformer windings 20, 21 and 22 alternating voltages are applied to the input circuits of both devices 1 and 2. The output current of device 2 is supplied to the output terminals 23 and 24 while the output current of device 1 flows through the potentiometer 17 thereby modifying the biasing potential of the grid 12 of device 2 and effecting a control over the output current of device 2.

The space current in space discharge device 1 flows through the potentiometer 17 in the direction from left to right. With the switch 47 in the position shown in Fig. 1 the grid 12 is connected to the more positive portion of the potentiometer and the filament 10 to the more negative portion. With this adjustment an increase in the space current of device 1 causes the grid 12 to become more positive, a condition which will be referred to hereinafter as a direct control. When switch 47 is moved to its lower position, the filament 10 is connected to the point 49, making the filament more positive than the grid. With this connection an increase in the output current of device 1 causes a decrease in the output current of device 2 and a reverse control is effected. The reaction of device 1 upon the output current of device 2 may be further regulated by adjusting the movable contacts of potentiometer 17, by adjusting the potentials of the batteries 8, 9, 15 and 16 and by changing the relative number of turns of windings 21 and 22.

Figure 4:
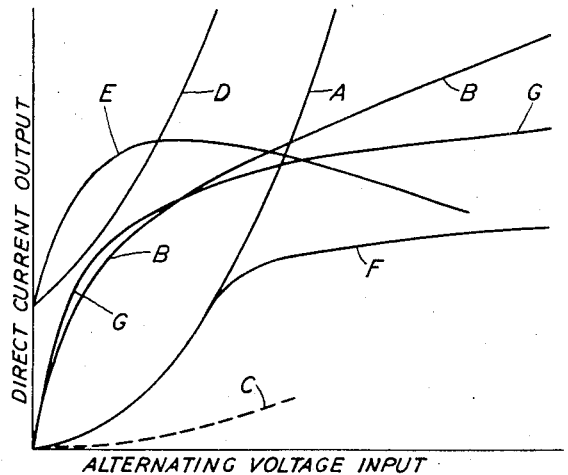
Fig. 4 is a graphical representation of certain relationships between input voltage and output current which may be secured with particular adjustments of the detectors illustrated in the preceding figures.

The ordinary detector characteristic of a normally blocked space discharge tube is represented by curve A of Fig. 4. The blocking is secured in the usual manner by applying such values of grid and plate battery voltages that no plate current flows unless at least a small positive increment of voltage is impressed upon the tube. Curve A and likewise the other curves of Fig. 4 show alternating voltage input plotted as abscissae and direct current output plotted as ordinates.

Curve B shows the effect of direct mutual control upon the form of curve A as obtained in the system of Fig. 1. The initial rise of the output current as the input voltage is increased is more rapid than in the normal detector characteristic without the control. The more rapid rise is due to two causes. First, there is an increased flow of space current in tube 2 as its grid biasing potential is changed in the positive direction. Second, there is an increase in the detecting efficiency of the tube as the effective energizing potential of the tube approaches a value equal to the fall of potential across the terminals of the filament. Finally the detecting efficiency reaches a maximum value and further increase in energizing potential then brings a decrease in detecting efficiency. The variation in the efficiency mentioned above is described in detail by H. J. Van der Bijl in his text book entitled "The Thermionic Vacuum Tube", first edition, 1920, at pages 328–332.

The effect of reverse control on the form of curve A is illustrated in curve C. Here the output is kept at comparatively low values as the grid biasing potential is changed in the negative direction. Not only is the increase of the space current retarded but there is at the same time a reducing effect upon the detecting efficiency.

Curve D represents the normal detector characteristic when there is a small initial polarizing voltage. The polarization gives rise to a space current which does not disappear when the alternating voltage input is removed.

Curve E shows the effect of a reverse control upon the form of curve D. As the initial polarizing potential is taken to be in excess of the voltage required for maximum detecting efficiency, a reverse control is necessary for obtaining a steep initial rise in curve E. The reverse control gives increased efficiency as the input increases and at first more than offsets the decreasing space current.

Curves B, C, D and E illustrate the principal types of variation in the shape of the detector characteristic which may be secured by means of the system of Fig. 1.

Figure 2:
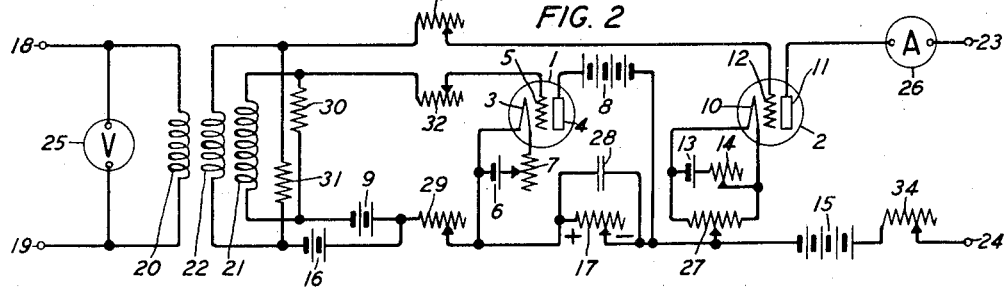

Fig. 2 illustrates a modification of the circuit shown in Fig. 1. Variable resistances 32 and 33 are provided which are individual to the respective input circuits of devices 1 and 2. A variable resistance 34 is added which is individual to the output circuit of device 2. Variable resistance 29 is common to the input circuits of devices 1 and 2. Shunt resistances 30 and 31 are provided across secondary windings 21 and 22, respectively. One terminal of battery 16 is connected at a point between battery 9 and resistance 29 instead of to a variable contact of potentiometer 17 as shown in Fig. 1. A potentiometer 27 is connected across the terminals of the filament 10 and a condenser 28 is provided in parallel with the potentiometer 17. The switch 47 shown in Fig. 1 has been omitted in Fig. 2, the control being a direct one.

The system of Fig. 2 operates in a manner similar to that of Fig. 1. The reaction between the devices 1 and 2 may, in the case of this system, be further regulated by adjustment of the potentiometer 27, the variable resistances 29, 32, 33 and 34 and by changing the relative values of the shunt resistance members 30 and 31.

Curve F of Fig. 4 shows the effect of grid circuit resistances (such as 32 and 33) on the form of curve A, causing a flattening off or saturation effect. The resistance 33, which is connected with grid 12, produces saturation effects only with values of the applied alternating voltage which are sufficiently large to overcome the biasing potential of grid battery 16 and cause conductive grid currents to flow in tube 2. This effect occurs mainly with the larger values of plate potential, which correspond to low values of detecting efficiency. Thus resistances 32 and 33 are effective in the upper ranges, while the mutual control is principally effective in the lower ranges.

Resistance 32 has a direct effect upon tube 1 similar to that of resistance 33 on tube 2 and this effect is exerted indirectly upon tube 2 due to the residual interaction between the two tube circuits.

Resistance 29 which is common to the grid circuits of devices 1 and 2, alters the grid biasing potential of both grids 5 and 12 when grid current flows in either device. The effect is proportionate to the combined grid currents.

The variable resistance 34 is effective to alter the input-output curve, an increase in the resistance tending to decrease the slope of the characteristic.

Potentiometer 27 serves to provide a fine adjustment of the initial grid biasing potential of tube 2.

The purpose of condenser 28 is to serve as a by-path for alternating currents which if permitted to flow in the common resistance element 17 tend to cause regeneration in tube 1. At the lower frequencies this condenser will have a certain regulatory effect upon the output of the detector by permitting some regenerative action to take place.

A steep initial rise in the characteristic curve is promoted by using several times as many turns in winding 21 and in winding 22, thus increasing the sensitivity of the control. The resistances 30 and 31 serve, among other purposes, as auxiliary means for adjusting the voltage ratio of inputs to the respective tubes 1 and 2, in conjunction with the windings 21 and 22.

Curve G shows an approximate cube root relationship between input and output which was secured in a system similar to that shown in Fig. 2, principally by a combination of the effects illustrated in curves B and F.

The space discharge devices employed in the system were Western Electric type "V" tubes. The values of the plate batteries 8 and 15 employed were 88.5 volts and 124 volts respectively. The grids were negatively biased by the batteries 9 and 16, the potentials of which were 1.5 volts and 13.5 volts respectively. The capacity of the condenser 28 was 0.05 mfds. The number of turns in winding 21 was ten times that in winding 22. The values of the resistances employed when the circuit was adjusted to give the input-output curve G were as shown in the following table:

| Resistance No. | Value of resistance |
| --- | --- |
|  | Ohms |
| 17 | 32,000 |
| 29 | Zero |
| 30 | 900,000 |
| 31 | 30,000 |
| 32 | 700,000 |
| 33 | 20,000 |
| 34 | 19,750 |

It is found upon applying interrupted currents, such as telegraph signals to the input terminals 18 and 19 that the rapid reversals of current give rise to transient currents, particularly in condenser 28 and in transformer windings 21 and 22 when grid current is flowing in these windings. These transients will disturb the normal action of the detector so that the expected characteristic curve is not realized. The transients in condenser 28 are best controlled by so proportioning the value of resistance 17 and the capacity of the condenser that the time constant of the combination is small relatively to the time between reversals of the telegraph current. The transients are then damped out in a small fraction of the time occupied by the telegraph signal or dot.

Figure 3:
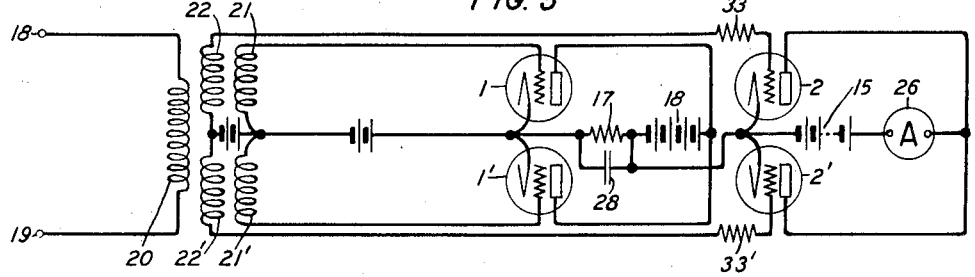

The resistances 30 and 31 are useful in damping out the transients in the windings 21 and 22 respectively. The effect of transients due to interrupted grid current in windings 21 and 22 may, however, be neutralized by employing a system of balanced tubes and balanced windings or push-pull arrangement as shown in Fig. 3. Tube 1 is associated with a like tube 1' through windings 21 and 21'. Tube 2 is balanced by a like tube 2' through windings 22 and 22'. Resistance 33 is balanced by a similar resistance 33'. Due to the symmetry of the arrangement, grid current from tube 1 in winding 21 offsets the effect of grid current from tube 1' in winding 21'. Grid current may be rapidly increased or decreased without producing serious transients. Likewise grid current from tube 2 in winding 22 offsets the effect of grid current from tube 2' in winding 22'.

By manipulation of the various adjustable elements, keeping in mind the general principles set down above, a system in accordance with the invention is readily adjusted to exhibit any one of many input-output relationships in addition to those illustrated in Fig. 4. In general a particular desired adjustment may be most conveniently found by the method of trial and error.

What is claimed is:

1. A detecting system comprising a main space discharge tube and an auxiliary tube connected to a common source of current to be detected, a resistance in the plate circuit of the auxiliary tube, means for applying the potential drop from the detected current in said resistance between the grid and cathode of said main tube, the grid of the main tube being connected to the positive terminal of the resistance and the cathode to the negative terminal to increase the ratio of detected current to applied current in said main tube at lower values of impressed current, and a current limiting resistance in circuit with at least one of said tubes adapted to decrease said ratio at higher values of applied current, to secure an output characteristic which rises rapidly at lower inputs and flattens off at higher inputs.

2. A detecting system comprising a main space discharge tube and an auxiliary tube connected to a common source of current to be detected, a resistance in the plate circuit of the auxiliary tube, means for applying the potential drop from the detected current in said resistance between the grid and cathode of said main tube, the grid of the main tube being connected to the positive portion of the resistance and the cathode to the negative portion to increase the sensitivity of said main tube for small impressed currents, and a current limiting impedance in circuit with said main tube to decrease the sensitivity for large impressed currents.

3. A detecting system comprising a main space discharge tube and an auxiliary tube connected to a common source of current to be detected, a resistance in the plate circuit of the auxiliary tube, means for applying the potential drop from the detected current in said resistance between the grid and cathode of said main tube, the grid of the main tube being connected to the positive portion of the resistance and the cathode to the negative portion to increase the sensitivity of the main tube for small impressed currents, and a current limiting impedance in circuit with the auxiliary tube to decrease the sensitizing effect of the auxiliary tube upon the main tube with large impressed currents.

ROGERS H. GALT.